(12) United States Patent
Iwasa

(10) Patent No.: US 10,976,802 B2
(45) Date of Patent: Apr. 13, 2021

(54) PORTABLE APPARATUS CONTROLLING STOPPING OF FUNCTIONS BASED ON TEMPERATURE, HEAT RELEASE PROPERTY AND STATIONARY STATUS

(71) Applicant: CANON KABUSHIKI KAISHA, Tokyo (JP)

(72) Inventor: Takeshi Iwasa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/175,603

(22) Filed: Oct. 30, 2018

(65) Prior Publication Data

US 2019/0138067 A1    May 9, 2019

(30) Foreign Application Priority Data

Nov. 6, 2017    (JP) .................................. 2017-213963

(51) Int. Cl.
| | |
|---|---|
| *G06F 1/20* | (2006.01) |
| *G06F 1/32* | (2019.01) |
| *G06F 1/3287* | (2019.01) |
| *G01K 1/14* | (2021.01) |
| *G06T 19/00* | (2011.01) |

(52) U.S. Cl.
CPC .............. *G06F 1/3287* (2013.01); *G01K 1/14* (2013.01); *G06F 1/203* (2013.01); *G06F 1/206* (2013.01); *G06T 19/006* (2013.01)

(58) Field of Classification Search
CPC ........... G01K 1/14; G06F 1/203; G06F 1/206; G06F 1/163; G06F 1/3215; G06F 1/3231; G06F 1/3265; G06F 1/3287; G06F 3/011; G06F 3/012; G06T 19/006
See application file for complete search history.

(56) References Cited

U.S. PATENT DOCUMENTS

| | | | |
|---|---|---|---|
| 2015/0311892 A1* | 10/2015 | Suzuki | ................... H03K 17/94 |
| | | | 307/117 |
| 2018/0075798 A1* | 3/2018 | Nho | ........................ G09G 3/32 |
| 2018/0082631 A1* | 3/2018 | Chang | .................. G09G 3/3225 |
| 2018/0136048 A1* | 5/2018 | Ozaki | ..................... B60L 53/12 |

FOREIGN PATENT DOCUMENTS

| | | |
|---|---|---|
| JP | 2001-117165 | 4/2001 |
| JP | 2015-184792 | * 10/2015 |

* cited by examiner

*Primary Examiner* — Chun Cao
(74) *Attorney, Agent, or Firm* — Venable LLP

(57) ABSTRACT

The present invention aims to appropriately prevent an excessive temperature rise of a portable apparatus according to a situation of a heat release property of the portable apparatus. For such a purpose, there is provided a portable apparatus which comprises: a temperature estimating unit configured to estimate a temperature of the portable apparatus; a heat release property determining unit configured to determine whether or not a heat release property of the portable apparatus satisfies predetermined performance, based on information related to an orientation of the portable apparatus; and a stop controlling unit configured to stop at least a part of functions of the portable apparatus, based on the temperature estimated by the temperature estimating unit and a determination result by the heat release property determining unit.

18 Claims, 5 Drawing Sheets

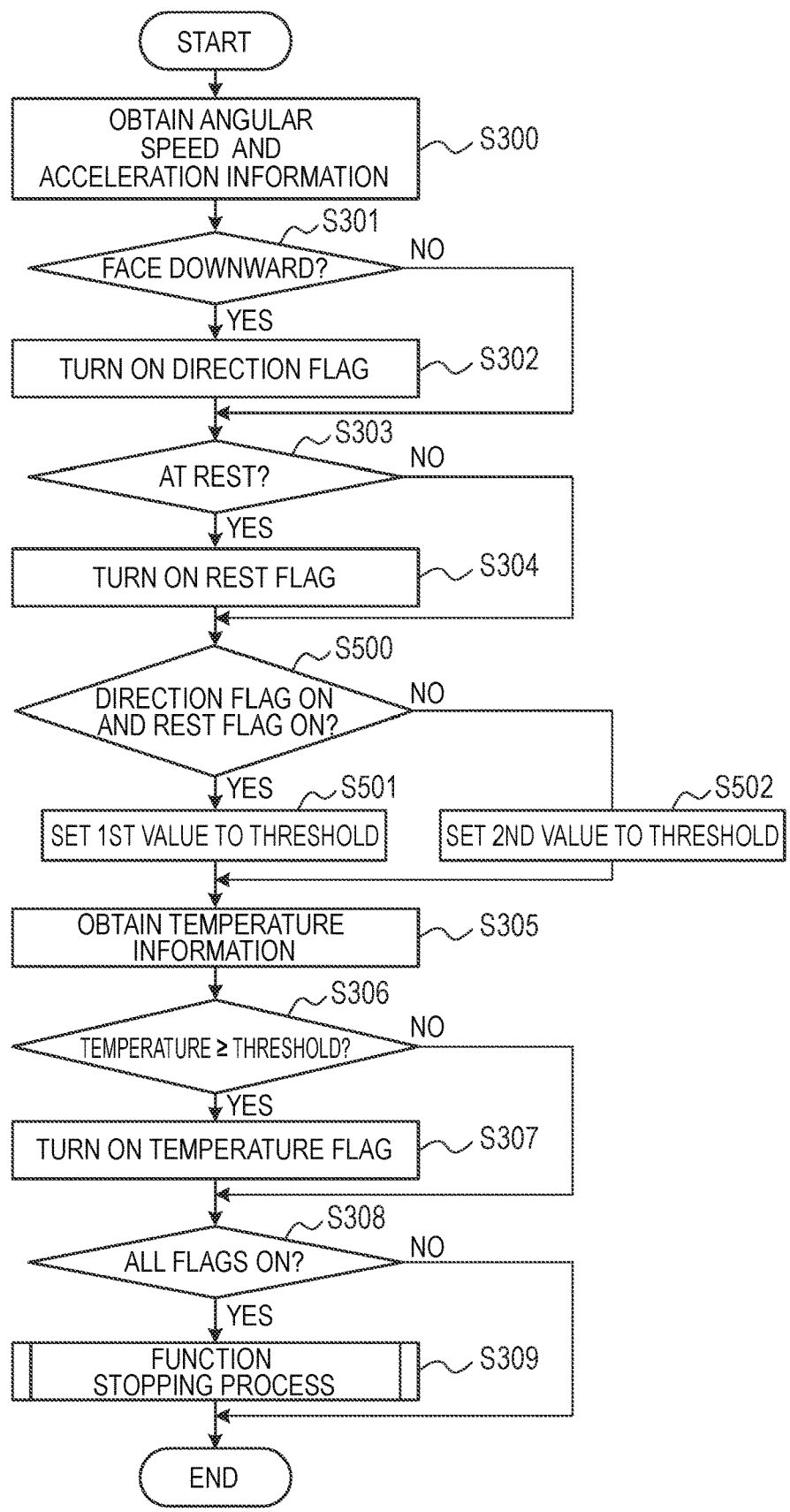

PORTABLE APPARATUS CONTROLLING STOPPING OF FUNCTIONS BASED ON TEMPERATURE, HEAT RELEASE PROPERTY AND STATIONARY STATUS

BACKGROUND OF THE INVENTION

Field of the Invention

The present invention relates to a technique of controlling a temperature of an apparatus.

Description of the Related Art

Conventionally, an MR (mixed reality) technique has been known as a technique of real-time and seamlessly merging a real space and a virtual space. In an MR system using a video see-through HMD (head-mounted display), an HMD wearer observes a composite image in which a CG (computer graphics) image is superposed on a real space image obtained by a capturing unit built in the HMD. These images are respectively independent corresponding to left and right eyes, so that a stereoscopic MR space based on a stereo moving image can be presented to the HMD wearer.

In an apparatus which is represented by the MR system handling a high-definition moving image, it is usual that a number of elements such as a semiconductor element for performing an image process, a capturing/displaying device and the like which are heat sources exist in a small and lightweight main body. A data amount of a moving image has increased in recent years, and also an amount of heat generation due to switching and the like tends to increase. As a result, there are cases where a temperature rises excessively depending on an operating situation of the apparatus and an installation environment of the apparatus, so that a mechanism for stopping the apparatus at a time of such an excessive temperature rise is incorporated.

Japanese Patent Application Laid-Open No. 2001-117165 discloses a method of, in a liquid crystal projector, setting up temperature sensors in an apparatus respectively above and below a light source, detecting an excessive temperature rise of the apparatus by each of the sensors, and stopping the apparatus based on detected results. Besides, Japanese Patent Application Laid-open No. 2015-184792 discloses a method of determining, at a time of excessive temperature rise, whether or not an operation restriction of a device being a heat source is necessary, based on an operation situation of an application operating in an apparatus.

However, in a case where a portable apparatus is placed in various directions, the method disclosed in Japanese Patent Application Laid-Open No. 2001-117165 and the method disclosed in Japanese Patent Application Laid-Open No. 2015-184792 do not pay attention to a point that a heat release (dissipation) property of the apparatus is different depending on a situation that the apparatus is placed, or the like. For this reason, even if the heat release property of the apparatus is different depending on the situation that the apparatus is placed, the temperature determined as the excessive temperature rise and the operation situation of the application are constant.

The present invention has been completed in view of such a problem as above, and an object of the present invention is to suppress the excessive temperature rise of the apparatus appropriately in accordance with the heat release property of the apparatus.

SUMMARY OF THE INVENTION

The present invention is directed to a portable apparatus which is characterized by comprises: a temperature estimating unit configured to estimate a temperature of the portable apparatus; a heat release property determining unit configured to determine whether or not a heat release property of the portable apparatus satisfies predetermined performance, based on information related to an orientation of the portable apparatus; and a stop controlling unit configured to stop at least a part of functions of the portable apparatus, based on the temperature estimated by the temperature estimating unit and a determination result by the heat release property determining unit.

According to the present invention, it is possible to appropriately suppress an excessive temperature rise of the portable apparatus in accordance with to the heat release property of the portable apparatus.

Further features of the present invention will become apparent from the following description of exemplary embodiments with reference to the attached drawings.

BRIEF DESCRIPTION OF THE DRAWINGS

FIG. 5 is a flowchart for describing a temperature controlling process according to a second embodiment.

DESCRIPTION OF THE EMBODIMENTS

Hereinafter, preferred embodiments of the present invention will be described with reference to the attached drawings.

First Embodiment

Figure 1:
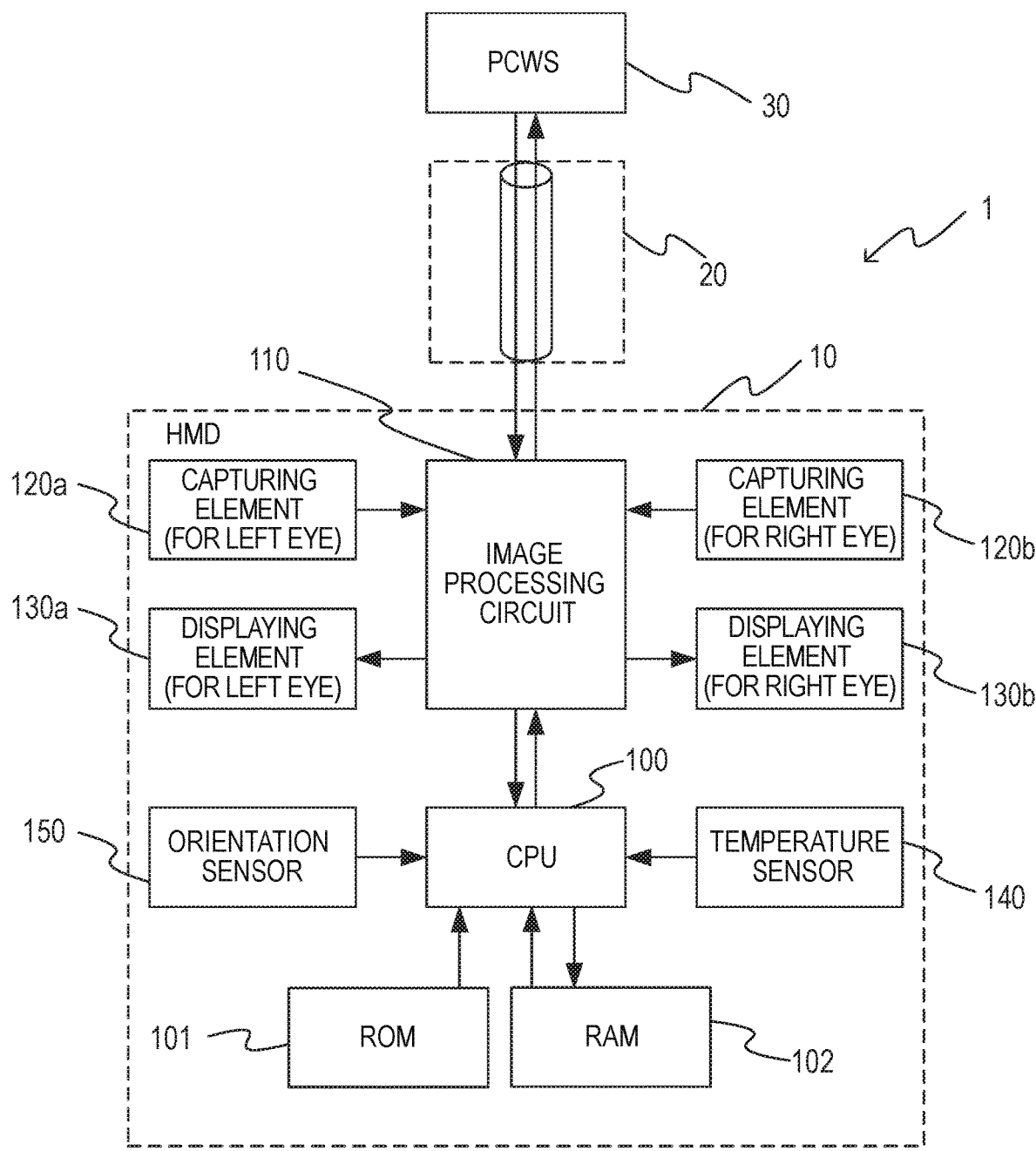
FIG. 1 is an overall view of a capturing/displaying system.

FIG. 1 is an overall view of a capturing/displaying system 1. The capturing/displaying system 1 comprises a head-mounted capturing/displaying device (hereinafter referred to as an HMD) 10, a PCWS (personal computer workstation) 30, and a cable 20 for connecting the HMD and the PCWS with each other. The PCWS 30 generates an image (composite image) of an MR (mixed reality) space in which a real space and a virtual space are fused, and provides the generated composite image to the HMD 10. Although the cable 20 is illustrated as a communication path for wired connection, a communication path for wireless connection may be used. The HMD 10 is one example of a portable apparatus and a portable displaying device.

Figure 2:
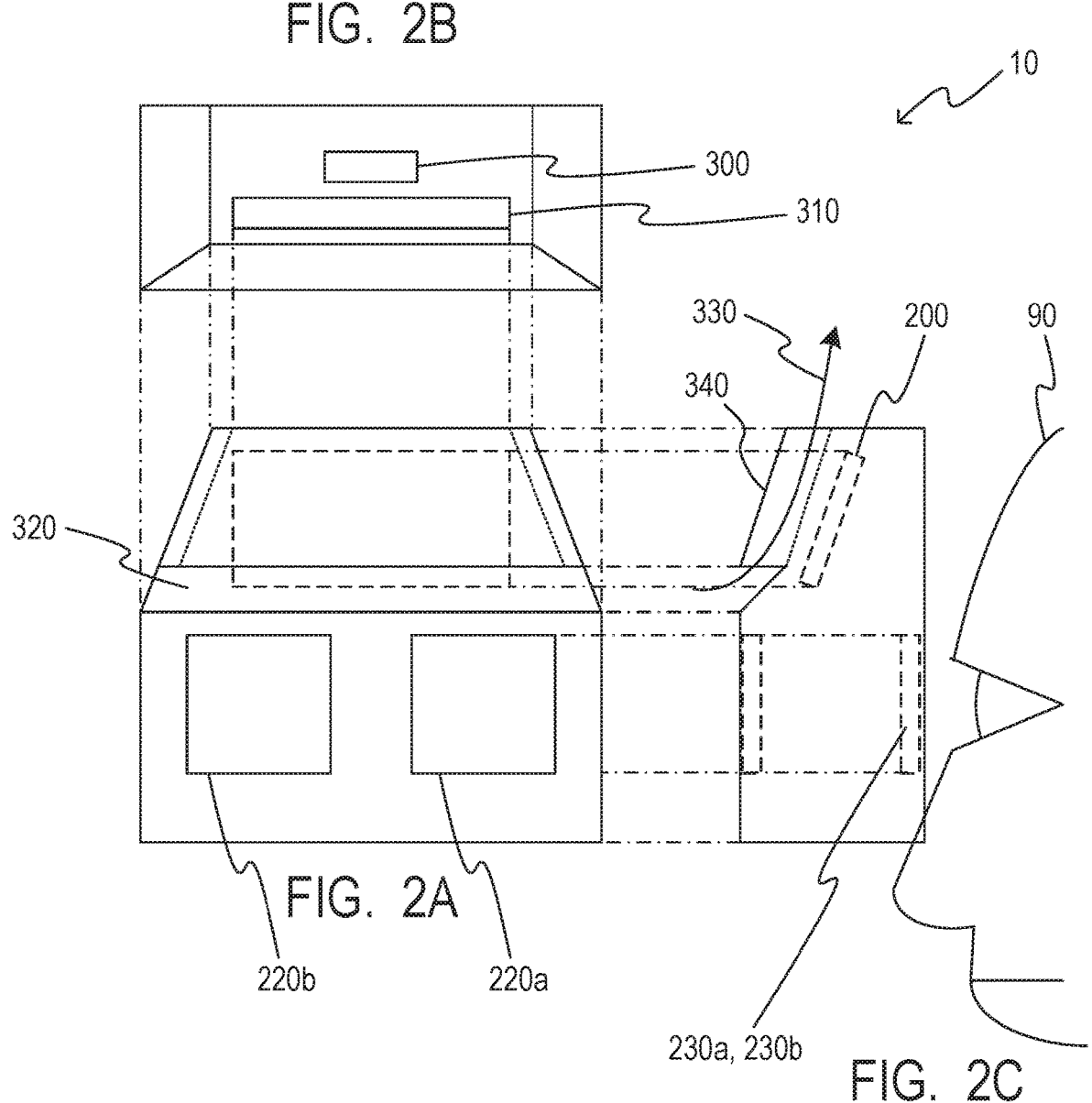
FIGS. 2A, 2B and 2C are diagrams for describing an HMD (head-mounted display).

FIGS. 2A to 2C are trihedral diagrams of the HMD 10, in which a wearing example of the HMD is shown. More specifically, FIG. 2A is the front view of the HMD 10, FIG. 2B is the plan view of the HMD 10, and FIG. 2C is the side view of the HMD 10. Besides, FIG. 2C shows the wearing example of the HMD 10. The cable 20 is connected to a connector 300 provided on the housing of the HMD 10. A fixture for causing a wearer 90 to wear the HMD 10 and a nose escape portion for avoiding the nose of the wearer are provided on the HMD 10.

The constitution of the HMD 10 will be described with reference to FIG. 1 and FIGS. 2A to 2C. Capturing elements 120a and 120b are CMOS (complementary metal oxide semiconductor) image sensors. As another example, the capturing elements 120a and 120b may be CCD (chargecoupled device) image sensors. The capturing elements 120a and 120b capture a stereoscopic video image in a real space respectively via capturing windows 220a and 220b provided on the housing of the HMD. For displaying elements 130a and 130b, an OLED (organic electroluminescence display), an LCD (liquid crystal display) or the like is used. The displaying elements 130a and 130b present a composite image to the wearer 90 of the HMD 10 via respective displaying windows 230a and 230b provided on the housing. Since the capturing/displaying system 1 handles a stereoscopic image using a right eye image and a left eye image, each of a pair of the capturing elements 120a and 120b, a pair of the displaying elements 130a and 130b, a pair of the capturing windows 220a and 220b, and a pair of the displaying windows 230a and 230b has a constitution composed of a right eye element and a left eye element.

A temperature sensor 140 measures a temperature inside the HMD 10, and outputs a measured temperature value to a CPU (central processing unit) 100. A process to be performed by the temperature sensor 140 is an example of a temperature estimating process. It is desirable that the temperature sensor 140 is installed in the vicinity of a portion where a temperature rises most. An orientation sensor 150 comprises an angular speed sensor and an acceleration sensor, detects an angular speed, an acceleration, an orientation and a direction, and transfers detected results to the CPU 100. Such transferred information is used not only for a later-described TSD (thermal shutdown (overheat protection)) process, but also for positioning to fuse the above real and virtual spaces.

With respect to the captured images by the capturing elements 120a and 120b and the composite image displayed on the displaying elements 130a and 130b, an image processing circuit 110 performs known image processes such as a process of correcting variations for elements, a process of adjusting a hue, and the like, on the basis of a command from the CPU 100. Further, the image processing circuit 110 mediates and controls communication between the CPU 100 and these elements and the PCWS 30. The CPU 100 controls the entire apparatus operations of the HMD 10. More specifically, the CPU starts and stops the HMD 10 starting from pressing of a not-illustrated power switch or the like, and sets such element groups based on instructions from the PCWS 30. A ROM (read only memory) 101 has stored therein various kinds of information and programs. Incidentally, later-described functions and processes of the HMD 10 are realized by the CPU 100 which reads out programs stored in the ROM 101 and executing the read-out programs.

It is necessary to mount the capturing elements 120a and 120b and the displaying elements 130a and 130b in combination with optical elements such as lenses, prisms and the like, so that installation of these elements is restricted. Besides, it is desirable that the orientation sensor 150 be mounted horizontally or vertically. Except for these matters, the CPU 100, the image processing circuit 110, the temperature sensor 140 and the like are mounted on a main board 200. A large number of elements are mounted on the main board 200. In particular, since the image processing circuit 110 processes high-resolution image data of four channels in total for capturing/display/left/right at high speed, heat generation of this circuit is large. On the other hand, a substantially tubular heat exhaust air duct which continues from a lower slit 320 to an upper slit 310 is provided on the housing exterior. Incidentally, heat generated in the main board 200 is transferred to the inside of the heat exhaust air duct mainly via a heat conductive sheet or the like, and is discharged to the atmosphere by an air flow 330 passing through the air duct in the direction indicated by the arrow of this figure or via an exterior cover 340 provided on the outside of the air duct. Here, the lower slit 320 and the upper slit 310 are an example of the air duct.

Next, an influence on a heat release (dissipation) property depending on a use situation of the HMD 10 will be described. In case of normal use, the wearer 90 is wearing the HMD 10 on his/her head. For this reason, although there are changes in movement and orientation, there is no situation where a contact situation between the lower slit 320 or the upper slit 310 constituting a heat releasing mechanism and the outside air or a contact situation between the exterior cover 340 outside the air duct and the outside air deteriorates, so that the sufficient heat release property is secured. At this time, the heat release property satisfies predetermined performance. However, when the HMD 10 is placed (or put) before or after use, the lower slit 320 or the upper slit 310 may be blocked, or the exterior cover 340 and the outside air may become difficult to come into contact with each other. Particularly, when the HMD 10 is left standing with its front facing downward, the lower slit 320 is substantially blocked, and the flow of air under the exterior cover 340 also decreases. When air permeability in the vicinity of the heat releasing mechanism deteriorates like this, the heat release property deteriorates. Besides, when the HMD 10 is left on a desk (for example, for the purpose of preventing damage) via a soft material such as a towel or the like, there is a possibility that the lower slit 320 is entirely blocked and the air under the exterior cover 340 almost disappears, so that the heat release property remarkably deteriorates. At this time, the heat release property does not satisfy the predetermined performance. On the other hand, the HMD 10 according to the present embodiment performs a temperature controlling process to prevent the HMD 10 from being excessively heated in such a situation. Here, the temperature controlling process is a process of performing the TSD process of suppressing a temperature rise according to a situation. More specifically, in the temperature controlling process, when it is determined that there is an excessive temperature rise, a process (TSD process) of stopping at least a part of the functions of the HMD 10 is performed. Here, it is assumed that the function to be stopped is preset.

Figure 3:
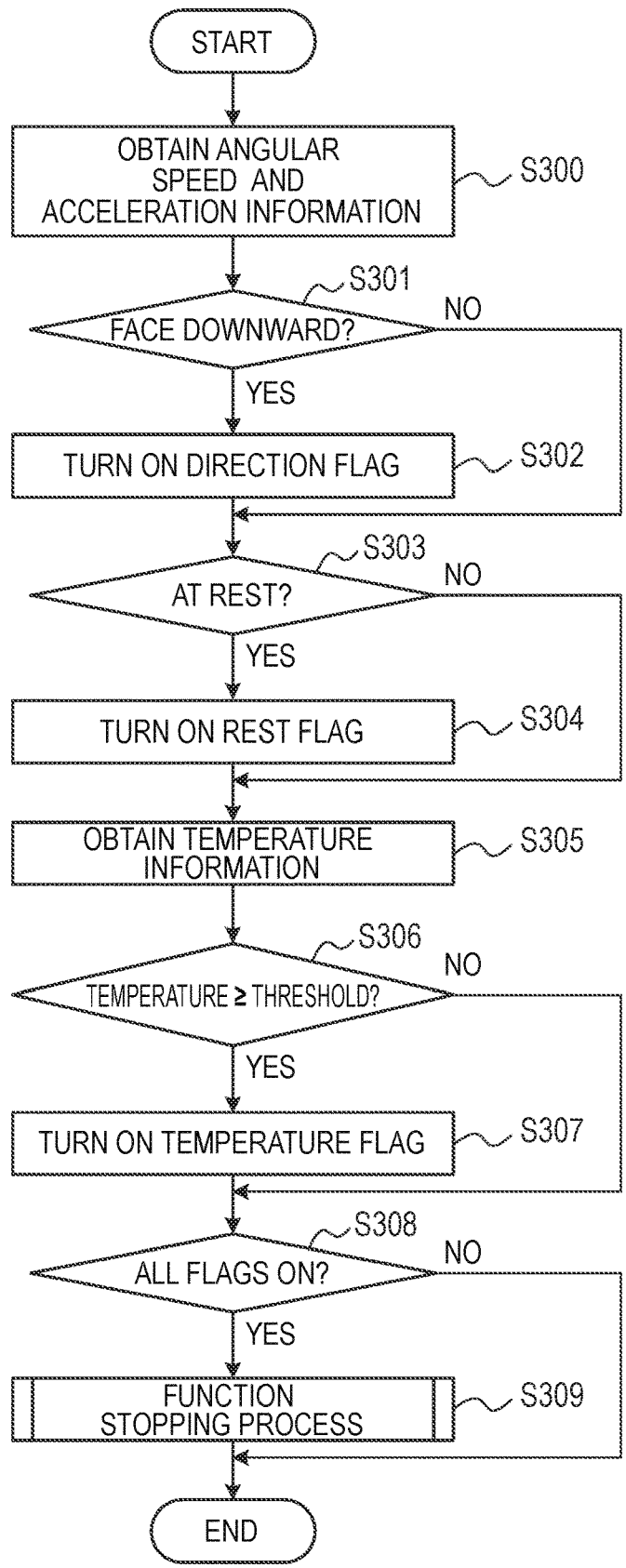
FIG. 3 is a flowchart for describing a temperature controlling process.

FIG. 3 is a flowchart for describing the temperature controlling process to be performed by the HMD 10. The temperature controlling process is a process of determining whether or not the process of stopping a predetermined function of the HMD 10 (hereinafter referred to as a function stopping process) is necessary as described above. The temperature controlling process is periodically performed by the CPU 100, for example, from 1 second to several seconds by a timer or the like. In S300, the CPU 100 obtains angular speed and acceleration information from the orientation sensor 150.

Next, in S301, the CPU 100 determines whether or not the HMD 10 faces downward using the obtained acceleration information. Here, the downward direction is a direction which is predetermined for the HMD 10 as a direction in which the heat release property of the HMD 10 may deteriorate. More specifically, it is assumed that a threshold to be used for determining that the acceleration information is substantially equal to the gravitational acceleration is preset in the CPU 100. Then, the CPU 100 determines whether or not the HMD faces downward by comparing the acceleration information and the threshold with each other. Incidentally, the direction in which the heat release property may deteriorate can be appropriately set to the CPU 100 according to a relationship with the position of the heat releasing mechanism provided in the HMD 10, and the direction is not limited to the downward direction. In S301, it may be determined whether or not the direction of the HMD 10 is a preset direction. Incidentally, the process of S301 is an example of a heat release property determining process of determining whether or not the heat release property satisfies the predetermined performance. When it is determined that the HMD 10 faces downward (YES in S301), the CPU 100 advances the process to S302. On the other hand, when it is determined that the HMD 10 does not face downward (NO in S301), the CPU 100 advances the process to S303.

In S302, the CPU 100 turns ON a direction flag temporarily stored in a RAM (random access memory) 102. The initial value of the direction flag is OFF. Next, in S303, the CPU 100 determines whether or not the HMD 10 is at rest, based on angular speed information. When a state, in which the absolute value of the angular speed information is sufficiently small enough to be regarded as the HMD is at rest, continues for a predetermined defined period of time or more, the CPU 100 determines that the HMD is at rest. Incidentally, it is assumed that a threshold for determining that the absolute value of the angular speed information is sufficiently small is preset in the CPU 100. The CPU 100 determines that the HMD is at rest when the angular speed is less than the threshold or when the state where the angular speed is less than the threshold continues for the defined period of time or more. When it is determined that the HMD is at rest (YES in S303), the CPU 100 advances the process to S304. On the other hand, when it is determined that the HMD is not at rest (NO in S303), the CPU 100 advances the process to S305. In S304, the CPU 100 turns ON a rest flag stored in the RAM 102. The initial value of the rest flag is OFF.

Next, in S305, the CPU 100 obtains temperature information from the temperature sensor 140. Next, in S306, the CPU 100 determines whether or not the obtained temperature information is equal to or higher than a preset threshold. When it is determined that the temperature information is equal to or higher than the threshold (YES in S306), the CPU 100 advances the process to S307. On the other hand, when it is determined that the temperature information is lower than the threshold (NO in S306), the CPU 100 advances the process to S308. In S307, the CPU 100 turns ON a temperature flag temporarily stored in the RAM 102. The initial value of the temperature flag is OFF. Next, in S308, the CPU 100 determines whether or not all the direction flag, the rest flag and the temperature flag are ON. When it is determined that all the flags are ON (YES in S308), the CPU 100 advances the process to S309. On the other hand, when it is determined that at least one flag is OFF (NO in S308), the CPU 100 ends the temperature controlling process without performing the function stopping process. In S309, the CPU 100 performs the function stopping process (TSD process).

Figure 4:
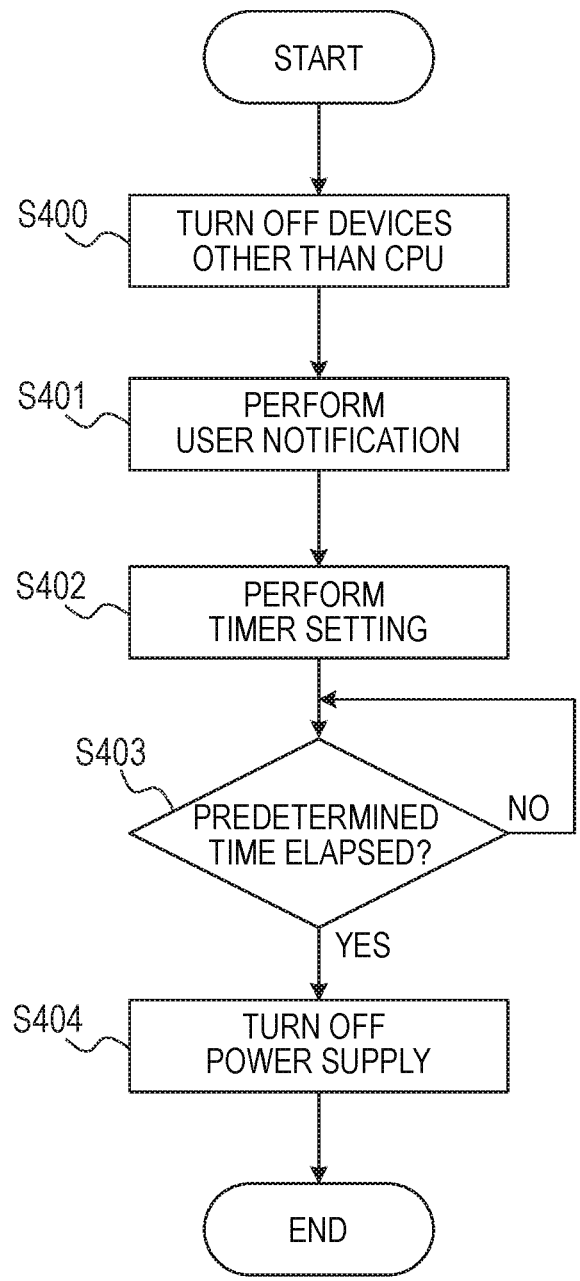
FIG. 4 is a flowchart for describing a function stopping process.

FIG. 4 is a flowchart for describing the function stopping process. In S400, the CPU 100 turns OFF power supply of devices, other than the CPU 100, corresponding to predetermined stop-target functions. A temperature rise can be suppressed by turning OFF the power supply of the devices being the heat sources. The process of S400 is an example of a stop controlling process of stopping the stop-target function based on a determination result as to whether or not the heat release property satisfies the predetermined performance. Next, in S401, the CPU 100 notifies a user that the function stopping process is being performed. As a user notifying method, LED (light emitting diode) color change or blinking, message display, and the like can be considered. The CPU 100 may output notification information which is recognizable by the user.

Next, in S402, the CPU 100 performs a timer setting for counting for a predetermined time such as 10 minutes or the like for the purpose of automatic power supply OFF. Next, in S403, the CPU 100 determines whether or not a predetermined time has elapsed. Next, the CPU 100 waits until the predetermined time elapses. Then, when it is determined that the predetermined time has elapsed (YES in S403), the CPU advances the process to S404. In S404, the CPU 100 turns OFF the power supply of the entire HMD 10. Thus, the function stopping process is completed.

As described above, based on the temperature of the HMD 10 and the direction of the HMD 10, the HMD 10 determines whether or not the heat release property satisfies the predetermined performance. When it is determined that the HMD does not satisfy the predetermined performance, the predetermined function is stopped. Thus, it is possible to prevent an excessive temperature rise of the apparatus. Furthermore, the CPU 100 performs the process of stopping the predetermined function only when the HMD is at rest for a defined period of time. Thus, it is possible to prevent that the function of the HMD 10 is suddenly stopped during work. In other words, it is possible to secure usability while preventing the excessive temperature rise.

A first modification of the first embodiment will be described. In the present embodiment, the power supply to the target function is turned OFF as the function stopping process. However, the process of stopping the function is not limited to that described in the present embodiment. In another example, as the function stopping process, a process of resetting the target function, a process of setting an inoperable state (module disable, etc.), or the like may be performed. As just described, the process of stopping the function can be appropriately designed according to a circuit constitution of the apparatus or the like.

A second modification will be described. In the present embodiment, the power supply to the function previously set as the stop target is turned OFF in S400, and then, after the predetermined time has elapsed, the power supply of the entire HMD 10 is turned OFF in S404. However, for example, in a case where all the functions of the HMD 10 are set as the stop targets, when all the flags are determined to be ON in S308, the CPU 100 immediately turns OFF the power supply for the entire HMD 10.

A third modification will be described. Namely, at least a part of the processes described in the present embodiment with reference to FIGS. 3 and 4 may be realized, for example, by properly cooperating a plurality of CPUs, RAMs, ROMs and storages. As another example, at least a part of the processes of the CPU 100 may be realized by using a hardware circuit. In that case, not only the sequential operation shown in the figure but also a process for which a definite causal relation is not necessary can be operated in parallel. Besides, it may be possible to use a circuit constitution in which the side of elements other than the CPU 100 performs ON/OFF of the flags and the CPU 100 only monitors the flags.

A fourth modification will be described. Namely, the process of determining whether or not the heat release property satisfies the predetermined performance is not limited to that described in the present embodiment. As another example, the HMD 10 may comprise an airflow meter installed in the heat exhaust air duct, and may determine whether or not the heat release property satisfies the predetermined performance on the basis of a measurement result of the airflow meter. More specifically, when a measured value is smaller than a preset threshold, the HMD 10 may determine that the heat release property does not satisfy the predetermined performance. Besides, as another example, the HMD 10 may comprise a distance measuring sensor, and may determine whether or not the heat release property satisfies the predetermined performance on the basis of a measurement result of the distance measuring sensor. The HMD 10 may determine that the heat release property does not satisfy the predetermined performance when a distance to a shield or a cover is smaller than the predetermined threshold.

As another example, the HMD 10 may estimate the direction based on images captured by the capturing elements 120*a* and 120*b*. For example, when the HMD is placed while facing downward, there is a high possibility that a uniform image such that all pixels are black will be photographed. Therefore, the HMD 10 may determine that the HMD faces downward when the uniform image is photographed and captured. More specifically, it is assumed that a threshold for determining the pixel value of the pixel included in the obtained image as black and a threshold of the number of pixels for determining that all the pixels are black are preset in the HMD 10. Then, the HMD 10 compares each pixel of the obtained image with the threshold. When the number of pixels determined as black is equal to or higher than the threshold, the HMD 10 determines that the HMD faces downward and thus determines that the heat release property does not satisfy a predetermined condition (predetermined performance).

A fifth modification will be described. In the first embodiment, the temperature sensor 140 is used to measure the temperature of the HMD 10. However, for example, the temperature of the HMD 10 may be implicitly estimated based on the operation situation of the CPU 140 and the situation of an application to be used. Besides, the temperature of the HMD 10 may be estimated based on both the measurement result by the temperature sensor and the operation situation of the CPU. In the present embodiment, the example of the HMD, which is the portable displaying apparatus, has been described, and there is a possibility that the apparatus like this is placed in various directions. It should be noted that the present embodiment can be widely applied as long as the apparatus is the portable apparatus of which the heat release property differs depending on the situation where the apparatus is placed.

Second Embodiment

Next, the capturing/displaying system 1 according to the second embodiment will be described. In the present embodiment, mainly the points different from the capturing/displaying system 1 according to the first embodiment will be described. FIG. 5 is a flowchart for describing the temperature controlling process by the HMD 10 according to the second embodiment. Incidentally, of the respective processes of the temperature controlling process shown in FIG. 5, the same processes as those of the temperature controlling process according to the first embodiment described with reference to FIG. 3 are denoted by the same reference numerals respectively. After the process of S304, the CPU 100 advances the process to S500. In S500, the CPU 100 determines whether or not the direction flag is ON and the rest flag is ON. When it is determined that both the direction flag and the rest flag are ON (YES in S500), the CPU 100 advances the process to S501. When it is determined that at least one of the direction flag and the rest flag is OFF (NO in S500), the CPU 100 advances the process to S502.

In S501, the CPU 100 sets a first value to the threshold to be compared with the temperature, and then advances the process to S305. On the other hand, in S502, the CPU 100 sets a second value to the threshold to be compared with the temperature, and then advances the process to S305. Here, it is assumed that the first value is set to be lower than the second value. Besides, it is assumed that the first value and the second value are previously set. When both the direction flag and the rest flag are ON, there is a high possibility of an excessive temperature rise as compared with a case where it is not so, so that it is necessary to suppress the excessive temperature rise at an early stage. Therefore, in this way, the threshold of the temperature is made different between the case where both the direction flag and the rest flag are ON and the case where it is not so. Incidentally, the other constitutions and processes of the capturing/displaying system 1 according to the second embodiment are the same as those of the capturing/displaying system 1 according to the first embodiment. As described above, also in the capturing/displaying system 1 according to the second embodiment, it is possible to secure usability while preventing the excessive temperature rise.

Although the preferred embodiments of the present invention have been described in detail as above, the present invention is not limited to the above specific embodiments, and various modifications and changes are possible within the scope of the gist of the present invention described in the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213963, filed Nov. 6, 2017, which is hereby incorporated by reference herein in its entirety.

What is claimed is:

1. A portable apparatus comprising:
one or more processors; and
one or more memories coupled to the one or more processors, the one or more memories having stored thereon instructions which, when executed by the one or more processors, cause the portable apparatus to:
estimate a temperature of the portable apparatus;
determine an orientation of the portable apparatus;
determine whether or not a heat release property of the portable apparatus satisfies predetermined performance, based on the determined orientation of the portable apparatus;
determine whether the portable apparatus is moving in a real space or remains stationary; and
stop at least a part of functions of the portable apparatus, in a case where the estimated temperature is equal to or higher than a threshold, and it is determined that the heat release property does not satisfy the predetermined performance and that the portable apparatus remains stationary.

2. The portable apparatus according to claim 1, further comprising a capturing device, wherein the instructions, when executed by the one or more processors, further cause the portable apparatus to determine whether or not the heat release property satisfies the predetermined performance, based on an image captured by the capturing device.

3. The portable apparatus according to claim 1, further comprising an airflow meter which measures a quantity of air of a wind path related to the heat release property, wherein the instructions, when executed by the one or more processors, further cause the portable apparatus to determine whether or not the heat release property satisfies the predetermined performance, based on a measurement result by the airflow meter.

4. The portable apparatus according to claim 1, further comprising a distance measuring sensor, wherein the instructions, when executed by the one or more processors, further cause the portable apparatus to determine whether or not the heat release property satisfies the predetermined performance, based on a measurement result by the distance measuring sensor.

5. The portable apparatus according to claim 1, wherein the instructions, when executed by the one or more processors, further cause the portable apparatus to stop the part of functions, in a case where it is determined that the portable apparatus remains stationary for a defined period of time or more.

6. The portable apparatus according to claim 1, wherein the instructions, when executed by the one or more processors, further cause the portable apparatus to output notification information in a case where at least the part of the functions of the portable apparatus is stopped.

7. The portable apparatus according to claim 1, wherein the portable apparatus is a portable displaying apparatus which has a display.

8. The portable apparatus according to claim 1, wherein the instructions, when executed by the one or more processors, further cause the portable apparatus to obtain acceleration of the portable apparatus, and the orientation of the portable apparatus is determined based on the obtained acceleration and gravitational acceleration.

9. The portable apparatus according to claim 1, wherein the instructions, when executed by the one or more processors, further cause the portable apparatus to acquire angular speed of the portable apparatus, and
it is determined whether the portable apparatus is moving or remains stationary based on the angular speed of the portable apparatus.

10. The portable apparatus according to claim 9, wherein a body of the portable apparatus is determined to remain stationary if a state where an absolute value of the angular speed is less than a threshold and continues for a predetermined period.

11. The portable apparatus according to claim 6, wherein at least the part of the functions of the portable apparatus is stopped after a predetermined time is elapsed from an output of the notification information.

12. A controlling method executed by one or more processors of a portable apparatus, comprising:
estimating a temperature of the portable apparatus;
determining an orientation of the portable apparatus;
determining whether or not a heat release property of the portable apparatus satisfies predetermined performance, based on the determined orientation of the portable apparatus;
determining whether the portable apparatus is moving in a real space or remains stationary; and
stopping at least a part of functions of the portable apparatus, in a case where the estimated temperature is equal to or higher than a threshold, and it is determined that the heat release property does not satisfy the predetermined performance and that the portable apparatus remains stationary.

13. The controlling method according to claim 12, wherein it is determined whether or not the heat release property satisfies the predetermined performance, based on an image captured by a capturing device.

14. The controlling method according to claim 12, wherein it is determined whether or not the heat release property satisfies the predetermined performance, based on a measurement result by an airflow meter configured which measures a quantity of air of a wind path related to the heat release property.

15. The controlling method according to claim 12, wherein it is determined whether or not the heat release property satisfies the predetermined performance, based on a measurement result by a distance measuring sensor.

16. The controlling method according to claim 12, wherein the part of functions is stopped in a case where it is determined that the portable apparatus remains stationary for a defined period of time or more.

17. The controlling method according to claim 12, further comprising outputting notification information in a case where at least the part of the functions of the portable apparatus is stopped.

18. A non-transitory computer-readable storage medium which stores a program that, when executed by one or more processors, causes a computer of a portable apparatus to:
estimate a temperature of the portable apparatus;
determine an orientation of the portable apparatus;
determine whether or not a heat release property of the portable apparatus satisfies predetermined performance, based on the determined orientation of the portable apparatus;

determine whether the portable apparatus is moving in a real space or remains stationary; and stop at least a part of functions of the portable apparatus, in a case where the estimated temperature is equal to or higher than a threshold, and it is determined that the heat release property does not satisfy the predetermined performance and that the portable apparatus remains stationary.

* * * * *